Feb. 20, 1968 — R. A. SPYRA — 3,369,420
POWER TRANSMISSION MECHANISM
Filed Nov. 7, 1966 — 3 Sheets-Sheet 2
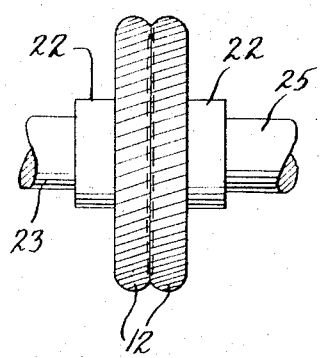
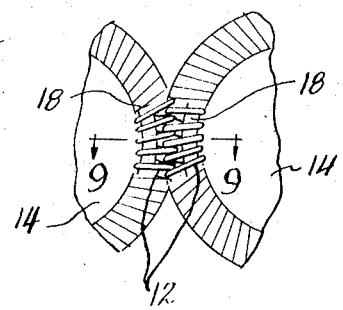
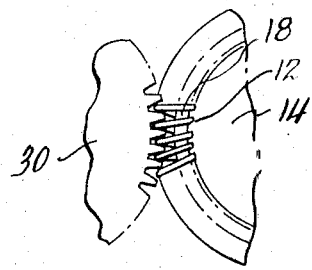
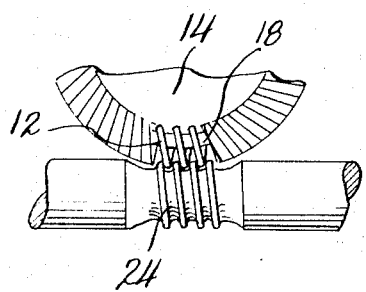
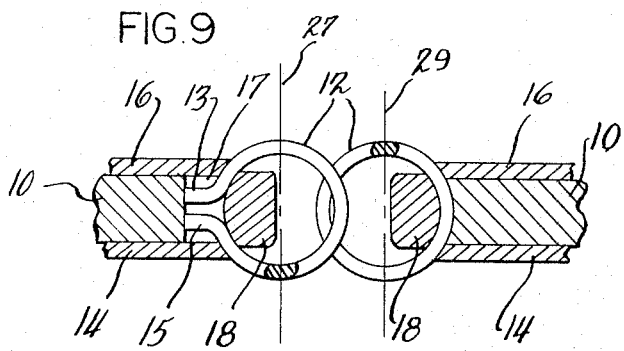
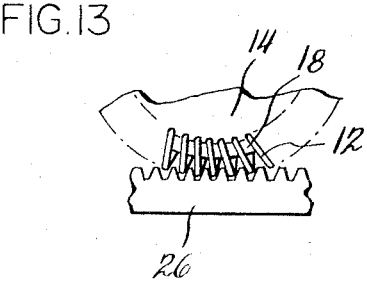
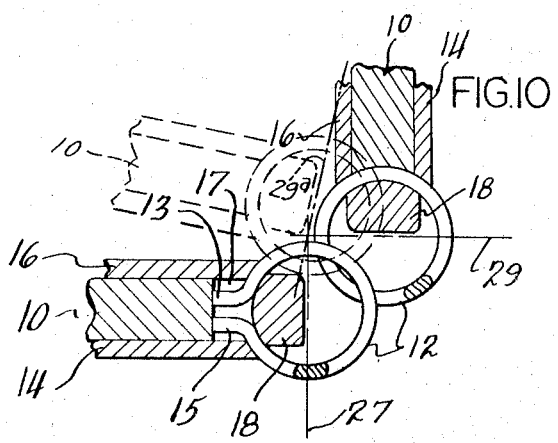
INVENTOR
RUDOLF A. SPYRA
BY Bair, Freeman & Molinare
ATTORNEYS.

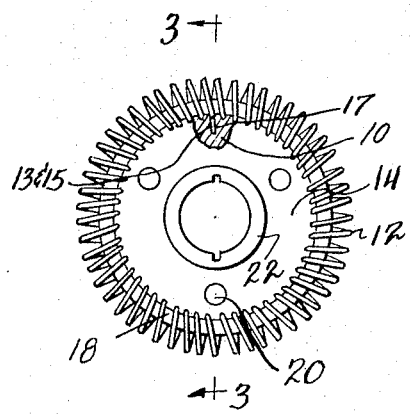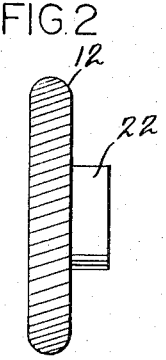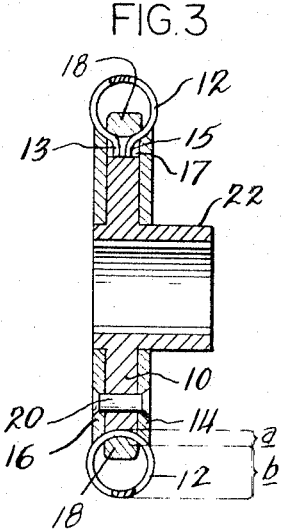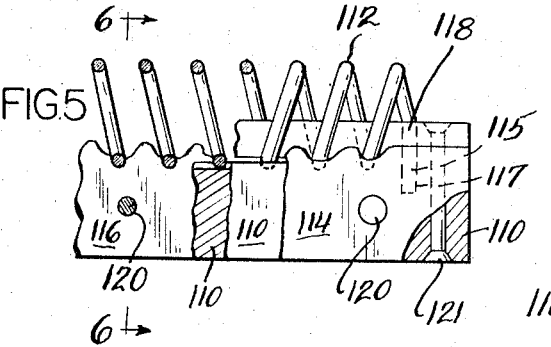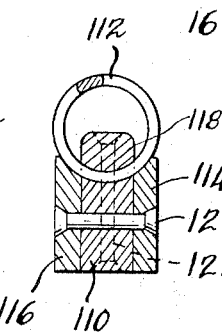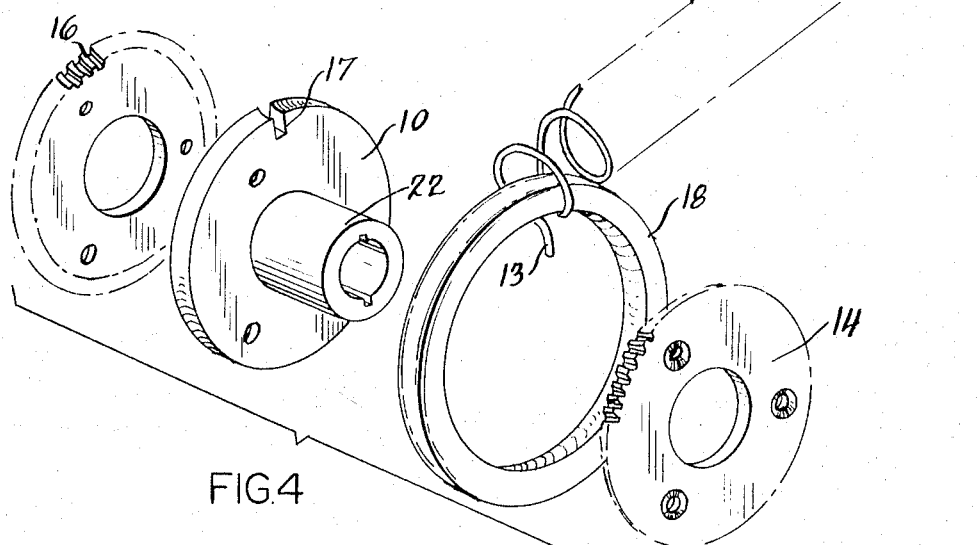

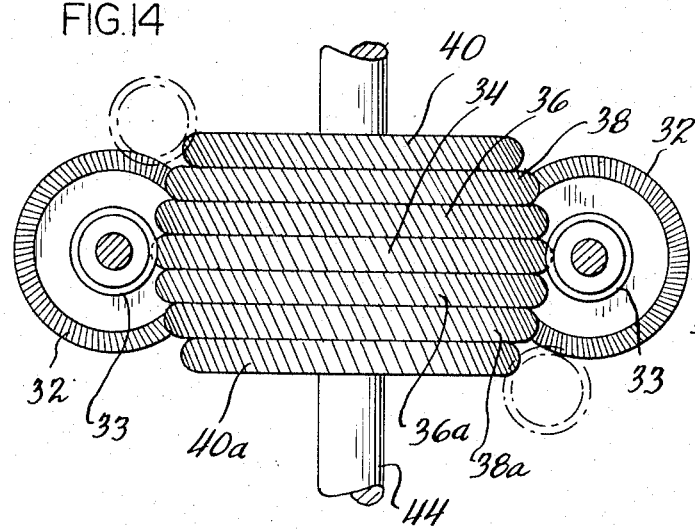
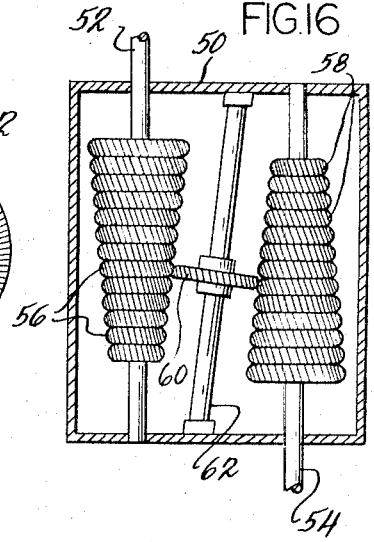
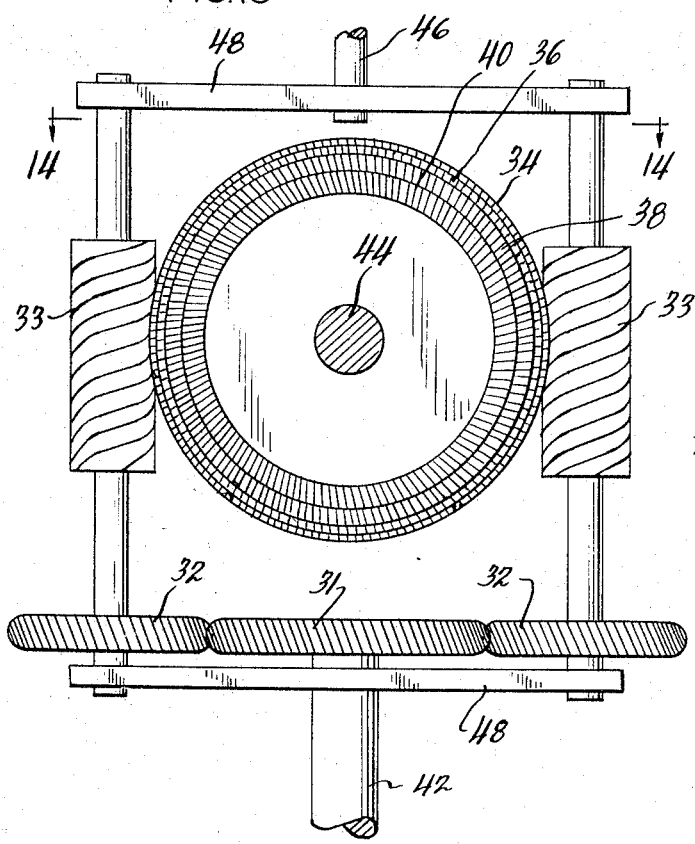
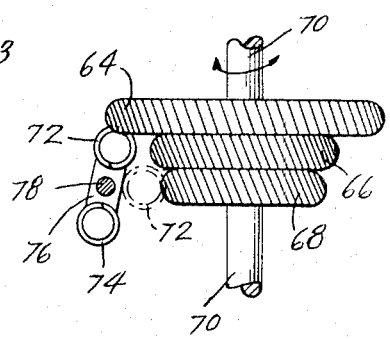
INVENTOR
RUDOLF A. SPYRA
BY Bair, Freeman & Molinare
ATTORNEYS.

United States Patent Office 3,369,420
Patented Feb. 20, 1968

3,369,420
POWER TRANSMISSION MECHANISM
Rudolf A. Spyra, % Burghof Engineering & Manufacturing Co., 1720 W. Diversey, Chicago, Ill. 60614
Filed Nov. 7, 1966, Ser. No. 592,466
10 Claims. (Cl. 74—411)

ABSTRACT OF THE DISCLOSURE

Power transmission mechanism in the form of coil springs and supports therefor, which can be either rotor or gear type transmission elements, or rack type transmission elements. The coil spring is held against the support by a rigid retainer element for firm anchorage of the spring to the support, and the convolutions of the spring are held accurately spaced by spacer elements which have spaced notches receiving the convolutions of the coil spring adjacent one or both sides of the support. Thus, the coil spring is rigidly mounted throughout the portion of each convolution adjacent the support to provide a commercially practical gear or rack in which the teeth are resilient yet are not unduly deflected during heavy loading.

Background and summary of invention

Coil springs as gear and rack teeth are known in the prior art but anchorage for the coil spring to a support has not been adequate. On the other hand I provide a combination of rigid retainer element and spacer element so associated with a support that the convolutions of the coil spring are accurately and rigidly spaced.

This invention relates to a power transmission element which includes a support having teeth-like projections, the projections comprising a coil spring which may mesh with another power transmission element of similar nature, with a gear, with a worm, or with a rack or the like.

One object of the invention is to provide a power transmission element in which the convolutions of the spring serve the purpose of resilient gear or rack teeth.

Another object is to provide a power transmission element comprising a support provided with spaced teeth-like projections therealong, the projections comprising a coil spring, and means being provided for securing the coil spring to the support so that the power transmission element may be in the form of either a rack or a gear.

Another object is to provide the support in the form of a rotor and the coil spring circumscribing the periphery of the rotor so that the power transmission element is in the form of a gear.

Still another object is to provide a retainer element for the coil spring in respect to the support, which, in the case of the support being a rotor, may comprise a retainer ring extending inside the coil spring and substantially in contact with the radially outward surfaces of the radially inward portions thereof, which radially inward portions are confined by the retainer against the support.

A further object is to provide means for equally spacing the convolutions of the coil spring and holding them thus spaced, comprising either a straight bar having a notched edge in the case of a rack, or a disc having a notched periphery in the case of a gear.

Still a further object is to provide a power transmission element which includes a coil spring as rack-like or gear-like teeth thereof, whereby the inherent resiliency of the coil spring may be utilized for preloading the "teeth" of the power transmission element with a predetermined spring load which eliminates backlash in meshing gears, racks and the like.

An additional object is to provide power transmission mechanism in the form of a pair of rotors having coil spring peripheries wherein the coils may mesh with each other to form a coupling, a pair of meshing "coil spring" gears with their axes parallel or at any angle relative to each other, or a rack and gear combination.

Another additional object is to provide a power transmission element comprising a rotor and a coil spring around the periphery thereof wherein the coil spring acts as a gear, and as such may mesh with another gear, worm gear or rack of standard construction and obtain the resiliency, and if desirable the preloading effect produced by the use of a coil spring in an environment such as specified.

A further additional object is to provide power transmission mechanism including combinations of various power transmission elements of the kind herein disclosed with worms, racks, spur gears and the like to form various types of power transmission systems, including positive drive means of variable speed character, both for rotation and reciprocation purposes.

With these and other objects in view, my invention consists in the construction, arrangement and combination of the various parts of my power transmission elements and the mechanism utilizing them, whereby the objects above contemplated are attained, as hereinafter more fully set forth, pointed out in my claims and illustrated in detail on the accompanying drawings, wherein:

Brief description of the drawings

FIG. 1 is an axial elevation of a power transmission element embodying my invention, showing it in the form of a coupling element or gear.

FIG. 2 is a side elevation thereof;

FIG. 3 is an enlarged sectional view on the line 3—3 of FIG. 1;

FIG. 4 is an exploded perspective view of the parts of the power transmission elements shown in FIGS. 1, 2 and 3;

FIG. 5 is a side elevation of a power transmission element embodying my invention and suitable for use as a rack, parts thereof being broken away and other parts shown in section to illustrate constructional features.

FIG. 6 is a sectional view on the line 6—6 of FIG. 5;

FIG. 7 is a side elevation similar to FIG. 2, showing two of my power transmission elements serving as a coupling between aligned shafts;

FIG. 8 is a semi-diagrammatic view similar to FIG. 1, showing two of my power transmission elements meshing gear-like with each other and mounted on shafts which are parallel to each other;

FIG. 9 is an enlarged sectional view on the line 9—9 of FIG. 8;

FIG. 10 is a similar sectional view in which two of my power transmission elements of FIGS. 1, 2 and 3 mesh with each other and are mounted on shafts which are at 90° to each other, the mesh being in the manner of bevel or miter gears;

FIG. 11 is a view similar to FIG. 8 showing one of my power transmission elements in the form of a gear meshing with a standard spur gear;

FIGS. 12 and 13 are views similar to FIG. 8, showing my type of power transmission gears meching with a worm gear of standard construction and a rack of standard construction respectively;

FIG. 14 is a diagrammatic plan view of a power transmission mechanism utilizing standard worm gears and several of my gear-like power transmission elements to provide a variable speed drive;

FIG. 15 is an end elevation of FIG. 1, FIG. 14 being a sectional view on the line 14—14 of FIG. 16;

FIG. 16 is a diargammatic sectional view of a power transmission housing wherein another modified form of variable speed drive utilizing my novel power transmission elements is utilized; and FIG. 17 is another diagrammatic view showing a gear and rack combination for variable speed oscillation of the gear or variable speed reciprocation of the rack.

*Description of the preferred embodiments*

On the accompanying drawings I have used in FIGS. 1 to 4 inclusive, the reference numeral 10 to indicate a support in the form of a rotor which may be provided with a hub 22 for mounting the rotor on a drive or driven shaft. The rotor 10 is in the form of a disc as shown in FIGS. 3 and 4. It serves as either a coupling element or a gear when provided with "teeth" which are formed by a coil spring 12 formed in the usual manner from spring wire. The coil spring is held in contact with the periphery of the disc 10 by a retainer ring 18, and the convolutions of the coil spring are held equally spaced by peripheral teeth in convolution spacing means in the form of discs 14 and 16, the teeth being formed at a suitable angle for substantially rigid mounting of the radially inward portions of the convolutions, as evident in FIG. 3, and the convolutions being held in the teeth by the retainer ring 18.

In the assembly of the parts of my power transmission element (refer to FIG. 4), the coil spring 12 is rotated clockwise to thread the convolutions thereof around the retainer ring 18 until completely mounted thereon, and the spring ends 13 and 15 are then adjacent each other as shown in section in FIGS. 1 and 3. These ends 13 and 15 are located in a slot 17 of the disc 10 as the disc is located inside the ring 18, and thereafter the discs 14 and 16 are engaged against opposite surfaces of the disc 10 and retained in position as by rivets or the like 20.

The power transmission element is now complete with the radially inward portions of the convolutions of the spring 12 (a in FIG. 3) rigidly connected by the discs 14 and 16 and the retainer ring 18, all assembled relative to the disc 10. The radially outward portions of the convolutions (b in FIG. 3) then serve as gear teeth with some degree of resilience because of the inherent spring-like character of the coil 12.

FIGS. 5 and 6 show how the application of the constructional features (thus far applied to a gear-like power transmission element) may be applied to a rack-like power transmission element, parts performing the same function as in FIGS. 1 to 4, being given the same reference numerals except 110, etc., instead of 10, etc. The support 110, the convolution spacing means 114 and 116 and the retaining means 118, it will be noted, extend in a straight line as required for rack construction, and the retainer element 118 may be secured in position as by rivets 121.

A pair of the power transmission elements such as disclosed in FIGS. 1, 2, 3 and 4 may be coupled together as in FIG. 7 to serve as a coupling means between substantially aligned shafts such as a drive shaft 23 and a driven shaft 25. Such a coupling may be preloaded or not as desired, as explained in the following paragraph, and affords tolerance for slight misalignment of the shafts 23 and 25.

A pair of my power transmission elements may, in a different relationship to each other, serve as gears meshing with each other as shown in FIGS. 8 and 9. In FIG. 9, center lines 27 and 29 are parallel to the axes of rotation of the gears. The spacing of the convolutions and the diameter of the wire forming the coil springs 12 may be selected so that the mesh of the two is somewhat loose or tight (preloaded) to any desirable degree, the latter condition eliminating backlash. The elimination of backlash is an important advantage of a gear of the type herein disclosed, and the degree of preloading can be nicely adjusted in a manner impossible with cut or stamped gear teeth.

It is also possible to arrange the two power transmission elements, as in FIG. 10, to serve as miter or bevel gears, the center lines 27 and 29 which are parallel to the axes of rotation being shown at 90° to each other instead of parallel as in FIG. 9. Obviously, the two coil springs can be meshed with each other at any angle between the parallel relationship shown in FIG. 9 and near a 180° relationship shown dotted in FIG. 10 and with center line 29a if desired or required. This is another advantage from the standpoint of versatility for gear elements of the type herein disclosed.

As shown in FIG. 11, a gear of my coil spring type may be meshed with an ordinary spur gear 30, or with a worm 24 as shown in FIG. 12, or a rack 26 as shown in FIG. 13. These are areas of further versality for a "coil spring" type of gear in accordance with my invention.

FIGS. 14 and 15 show an arrangement of my coil spring gears and a pair of worms 33 to provide a four-speed power transmission mechanism. A drive shaft 42 is shown carrying one of my coil spring gears 31 which meshes with coil spring gears 32 to drive the worms 33. A series of different size coil spring gears 34, 36, 36a, 38, 38a and 40 and 40a is carried by a driven shaft 44, and the shafts for gears 32 and worm 33 are carried by a frame 48 pivoted on the drive shaft 42 and a coaxial pivot 46. When the power transmission mechanism is adjusted as shown by solid lines in FIG. 14 a certain speed reduction is in effect by reason of the worms 33 meshing with the relatively large coil spring gear 34. When adjusted to the dotted line position, the worms are in mesh with the smallest of the coil spring gears 40 and 40a thus increasing the speed of rotation of the shaft 44. The gears 36, 36a, 38 and 38a provide intermediate speeds.

Another variable speed arrangement is shown in FIG. 16 wherein a transmission housing 50 is provided having a drive shaft 52 and a driven shaft 54 journaled therein. A stack of different size coil spring gears 56 is mounted on the drive shaft 52 and a similar stack 58 in reverse order on the driven shaft 54. An intermediate coil spring gear 60 is slidable along a shaft 62 to mesh with any desired opposite gears 56 and 58 for highest speed at the upper end of the figure and lowest speed at the lower end thereof.

FIG. 17 illustrates three different sizes of coil spring gears 64, 66 and 68 mounted on a drive or driven shaft 70 and a pair of coil spring racks 72 and 74 mounted on a support 76 that both reciprocates and revolves about a shaft 78. Accordingly, the rack 72 may mesh with any one of the gears 64, 66 or 68, and likewise the rack 74 may mesh with any of the three gears. Two racks are provided if it is desirable to have a graduated reduction in speed or increase in speed upon rotation about the axis 78 as distinguished from oscillating a coil spring rack clockwise for change of speed in one direction and counterclockwise for change of speed in the other direction. The rack 72 is shown in solid lines meshing with the gear 64 and by dot-and-dash lines meshing with the gear 68.

The shaft 70, if a drive shaft, would be of the oscillating type in order to reciprocate the rack 72 or 74 through a variable stroke depending on the mesh thereof with a selected one of the gears 64, 66 or 68. On the other hand, if the shaft 70 is a driven shaft, then the racks 72 and 74 may be reciprocated through a predetermined stroke and will effect a variable degree of oscillation of the shaft 70 depending on the mesh of the rack with any of the three gears in an obvious manner.

Some changes may be made in the construction and arrangement of the parts of my power transmission elements and the mechanism in which they are incorporated without departing from the real spirit and purpose of my invention, and it is my intention to cover by my claims any modified forms of structure or use of mechanical equivalents which may reasonably be included within their scope.

I claim as my invention:

1. In a power transmission element, a support provided with spaced teeth-like projections therealong, said projections comprising a coil spring, a rigid retainer element within said coil spring for confining the portions of the convolutions thereof adjacent said support substantially in contact therewith.

2. A power transmission element in accordance with claim 1 wherein said rigid retainer element extends along the inside of the convolutions of said coil spring and substantially in contact with the inner surface portions thereof adjacent said support, and is held in fixed, spaced relation to said support.

3. A power transmission element in accordance with claim 1 wherein means is provided to equally space the convolutions of said coil spring comprising a spacer element having spaced notches receiving said convolutions, and means for securing said spacer element to one side of said support.

4. A power transmission element in accordance with claim 1 wherein said support is a rotor having an axis of rotation, said teeth-like projections are on the periphery thereof, said coil spring circumscribes said periphery, and said rigid retainer element is a peripherally extending ring coacting with the radially inward portions of the convolutions thereof.

5. A power transmission element in accordance with claim 4 wherein said means to equally space the convolutions of said coil spring comprises a disc secured to one side of said rotor and having circumferentially spaced notches receiving said convolutions.

6. A power transmission element in accordance with claim 4 wherein means is provided to equally space the convolutions of said coil spring comprising a disc secured to each side of said rotor and having circumferentially spaced notches in the periphery thereof receiving said convolutions.

7. A power transmission mechanism comprising the combination of a power transmission element according to claim 4 serving as a worm gear, and a conventional worm meshing therewith.

8. A power transmission mechanism comprising a pair of power transmission elements such as claimed in claim 1 wherein said pair of elements are so positioned relative to each other that the convolutions of one of said elements mesh with the convolutions of the other of said elements for transmission of power from said one element to said other element in the manner of a gear and rack.

9. A power transmission mechanism comprising a pair of power transmission elements such as claimed in claim 1 wherein said pair of elements are so positioned relative to each other that the convolutions of one of said elements mesh with the convolutions of the other of said elements for transmission of power from said one element to said other element in the manner of a coupling between substantially aligned shafts.

10. A power transmission element in accordance with claim 1 wherein the ends of said coil spring project toward said support, and recess means is provided in said support to receive said ends, said retainer element being operable to also retain said ends in said recess means.

References Cited
UNITED STATES PATENTS

| | | |
|---|---|---|
| 597,907 | 1/1898 | Jackson. |
| 1,123,747 | 1/1915 | Hughes. |
| 2,824,332 | 2/1958 | Gibson _____ 15—253 |
| 3,121,340 | 2/1964 | Anthony _____ 74—459 |
| 3,174,354 | 3/1965 | Kuehnle _____ 74—424.5 |

DONLEY J. STOCKING, *Primary Examiner.*

L. H. GERIN, *Assistant Examiner.*